(12) United States Patent
Cheng (10) Patent No.: US 10,256,966 B2
(45) Date of Patent: Apr. 9, 2019

(54) INTEGRATED MULTIPLE-INPUT MULTIPLE-OUTPUT MULTI-BAND BANDPASS FILTER BANK

(71) Applicant: ZTE Canada Inc., Toronto (CA)

(72) Inventor: Dajun Cheng, Kanata (CA)

(73) Assignee: ZTE Canada Inc., Toronto, Ontario (CA)

( * ) Notice: Subject to any disclaimer, the term of this patent is extended or adjusted under 35 U.S.C. 154(b) by 58 days.

(21) Appl. No.: 15/481,130

(22) Filed: Apr. 6, 2017

(65) Prior Publication Data
US 2017/0295007 A1 Oct. 12, 2017

Related U.S. Application Data

(60) Provisional application No. 62/319,156, filed on Apr. 6, 2016.

(51) Int. Cl.
*H04L 5/14* (2006.01)
*H04B 7/0413* (2017.01)

(52) U.S. Cl.
CPC .......... *H04L 5/1469* (2013.01); *H04L 5/143* (2013.01); *H04B 7/0413* (2013.01)

(58) Field of Classification Search
CPC ..... H04B 7/0413; H04L 5/143; H04L 5/1469; H01P 1/2002; H01P 5/1022; H01P 5/12; H01P 5/16; H01P 7/10
See application file for complete search history.

(56) References Cited

U.S. PATENT DOCUMENTS

| | | | |
|---|---|---|---|
| 10,027,006 B2 * | 7/2018 | Cheng | H01P 1/2002 |
| 2005/0030133 A1 | 2/2005 | Rawnick et al. | |
| 2007/0024399 A1 | 2/2007 | Martin Antolin et al. | |
| 2008/0079644 A1 * | 4/2008 | Cheng | H01Q 13/10 343/769 |
| 2010/0253374 A1 * | 10/2010 | Chen | G01R 31/31905 324/756.03 |
| 2011/0037529 A1 | 2/2011 | Kishimoto | |
| 2011/0074527 A1 * | 3/2011 | Wakata | H01P 1/20345 333/204 |
| 2012/0184231 A1 | 7/2012 | Cheng et al. | |

(Continued)

*Primary Examiner* — David B Lugo
(74) *Attorney, Agent, or Firm* — Perkins Coie LLP (57) ABSTRACT

Techniques for multiband radio frequency (RF) signal communications using integrated multiple-input multiple-output (MIMO) multiband bandpass filter bank based on concentric dielectric ring resonators are described. The integrated MIMO multiband bandpass filter bank includes a plurality of transmission line structures for transmitting and receiving radio frequency (RF) signals, and a plurality of ring resonators with different sizes and different resonant frequencies electromagnetically coupled to the plurality of transmission line structures, wherein each ring resonator of the plurality of concentric ring resonators is configured as a single-band bandpass filter to allow a bandpass signal to pass through. By the use of integrated MIMO multiband bandpass filter bank, multiple desired bandpass signals corresponding to the multiple resonant frequencies of the multiple dielectric ring resonators can operate to transmit and receive in the processing of multiband RF signals while having out-of-band spurious emission and interference rejection.

30 Claims, 9 Drawing Sheets (56) References Cited

U.S. PATENT DOCUMENTS

2012/0280872 A1* 11/2012 Werner ............. H01Q 15/0053
　　　　　　　　　　　　　　　　　　　　　　　343/753
2014/0104136 A1　　4/2014　Werner et al.
2016/0126622 A1　　5/2016　Cheng et al.
2016/0294031 A1　10/2016　Cheng et al.

* cited by examiner

INTEGRATED MULTIPLE-INPUT MULTIPLE-OUTPUT MULTI-BAND BANDPASS FILTER BANK

CROSS REFERENCE TO RELATED APPLICATIONS

This patent document claims the benefit of priority of U.S. Provisional Patent Application No. 62/319,156, filed on Apr. 6, 2016. The entire content of the before-mentioned patent application is incorporated by reference as part of the disclosure of this document.

TECHNICAL FIELD

This patent document relates to systems, devices, and processes that are in the field of radio frequency communications, more specifically, multi-band radio frequency signal communications.

BACKGROUND

Signals at different radio frequency (RF) bands are frequently used in various wireless communication applications, such as portable wireless communication devices. Examples of multi-band RF communication technologies include but not limited to CDMA of BC0/1/6, GSM of band 2/3/5/8, WCDMA of band 1/2/4/5/6/8, TD-SCDMA of band 34/39, FDD LTE of band 1/2/3/4/5/7/8/12/13/17/20/25/26, TDD LTE of band 38/39/40/41, GPS, Wi-Fi (2.4 GHz and 5 GHz bands), and others.

Various commonly used multi-band multi-radio system designs are based on multiple discrete components of single-band bandpass filters, duplexers, and switches to handle the multi-band radio operations, such as out-of-band noise and interference, spurious emission, and antenna isolation. Such single-band bandpass filters and duplexer are discrete components and are used to separately filter their corresponding RF signals at different RF carrier frequencies, respectively.

SUMMARY

The technology disclosed in this patent document provides apparatus and methods for multiband RF communications using an integrated multiple-input multiple-output multiband bandpass filter bank based on concentric dielectric ring resonators.

By the use of the integrated multiple-input multiple-output (MIMO) RF multiband bandpass filter bank, multiple desired bandpass signals, corresponding to multiple resonant frequencies of the multiple dielectric ring resonators, can be transmitted and received in the processing of multiband RF signals. By constructing the integrated MIMO RF multiband bandpass filter bank using concentric ring configurations, the conventional real estate requirement of the PCB of multiple spatially-separated discrete bandpass filters, duplexer, and switches is significantly reduced.

Using dielectric materials with high relative permittivity to build the concentric ring resonators, the disclosed technology can achieve very high quality (Q) value in the bandpass operation, thereby providing high rejection to the out-of-band spurious emission and interference. Furthermore, since the resonant frequencies of the disclosed ring resonators are shape-dependent and would be nonlinear functions of the dimensions in the cases of circular or elliptical geometries, the harmonics of a desired passband signal would be greatly attenuated and rejected.

In one aspect, an integrated MIMO multi-band bandpass filter bank is disclosed. The integrated MIMO multi-band bandpass filter bank comprises a plurality of transmission line structures for transmitting and receiving radio frequency (RF) signals, and a plurality of concentric ring resonators with different sizes and different resonant frequencies electromagnetically coupled to the plurality of transmission line structures, where each ring resonator of the plurality of concentric ring resonators is configured as a single-band bandpass filter to allow a bandpass signal to pass through.

In another aspect, a multi-band radio frequency communication device is disclosed. The device comprises a multi-band antenna, a band selection switch coupled to the multi-band antenna, a plurality of multi-band RF transceiver circuits for RF signal transmission, and an integrated multi-band bandpass filter bank including a plurality of RF input ports coupled to the band selection switch and a plurality of RF output ports coupled to the plurality of multi-band RF transceiver circuits.

In a further aspect, a method for filtering multi-band RF signals within a multi-band RF communication device is disclosed. The method comprises receiving RF signals by a plurality of multi-band transmission lines; coupling the RF signals to an integrated multi-band bandpass filter bank comprising a plurality of ring resonators, wherein each ring resonator of the plurality of dielectric ring resonators operates at a separately desired frequency; and filtering, at the integrated multi-band bandpass filter, the RF signals into desired passband signals.

This and other aspects and their implementations are described in greater detail in the drawings, the description and the claims.

DETAILED DESCRIPTION

Signals at different radio frequency (RF) bands are frequently used in various wireless communication applications, such as portable wireless communication devices. Various commonly used multi-band multi-radio system designs are based on a plurality of multiple discrete components of single-band bandpass filters, duplexers, and switches to handle the multi-band radio operations, such as out-of-band noise and interference, spurious emission, and antenna isolation. Such single-band bandpass filters and duplexer are discrete components and are used to separately filter their corresponding RF signals at different RF carrier frequencies, respectively. These discrete components of single-band bandpass filters and duplexers require large real estate in the printed circuit board (PCB) of the multi-band multi-radio system. To accommodate a plurality of multi-band multiple-protocol wireless communication operation in a space-limited portable wireless communication devices, it is desirable to have integrated multi-band bandpass filter that require small real estate of land pattern in the PCB.

Dielectric resonators can be designed to operate at various electromagnetic spectrum frequencies to operate at RF frequencies for filtering signals at RF frequencies. The technology disclosed in this patent document provides apparatus and methods for multi-band RF communications using integrated multiple-input multiple-output multi-band bandpass filter bank based on concentric dielectric ring resonators. The disclosed technology integrates dielectric resonators into a MIMO multi-band bandpass filter bank to achieve multi-band bandpass characteristics with high quality factor at desired RF frequency bands.

By the use of the integrated MIMO RF multi-band bandpass filter bank, multiple desired bandpass signals corresponding to the multiple resonant frequencies of the multiple dielectric ring resonators can be transmitted and received in the processing of multi-band RF signals. By constructing the integrated MIMO RF multi-band bandpass filter bank using concentric ring configurations, the real estate requirement of the PCB of multiple spatially-separated discrete bandpass filters, duplexer, and switches is significantly reduced.

Using dielectric materials with high relative permittivity to build the concentric ring resonators, the disclosed technology could achieve very high Q value in the bandpass operation, thereby providing high rejection to the out-of-band spurious emission and interference. Furthermore, since the resonant frequencies of the proposed ring resonators are shape-dependent and would be nonlinear functions of the dimensions in the cases of circular or elliptical geometries, the harmonics of a desired passband signal would be greatly attenuated and rejected.

It should be understood that the words "Band 1", "Band 2", "Band N" etc. are used in the description solely for the purpose of identifying and distinguishing between RF bands in the description, and are not intended to signify a particular operating frequency spectrum. In some embodiments, each Band may represent a portion of spectrum that is contiguous in the frequency domain and is used in an all-or-none manner. Alternatively, a Band may represent a minimum and maximum frequency range within which individual channels of smaller spectral width may be used for communication.

Figure 1:
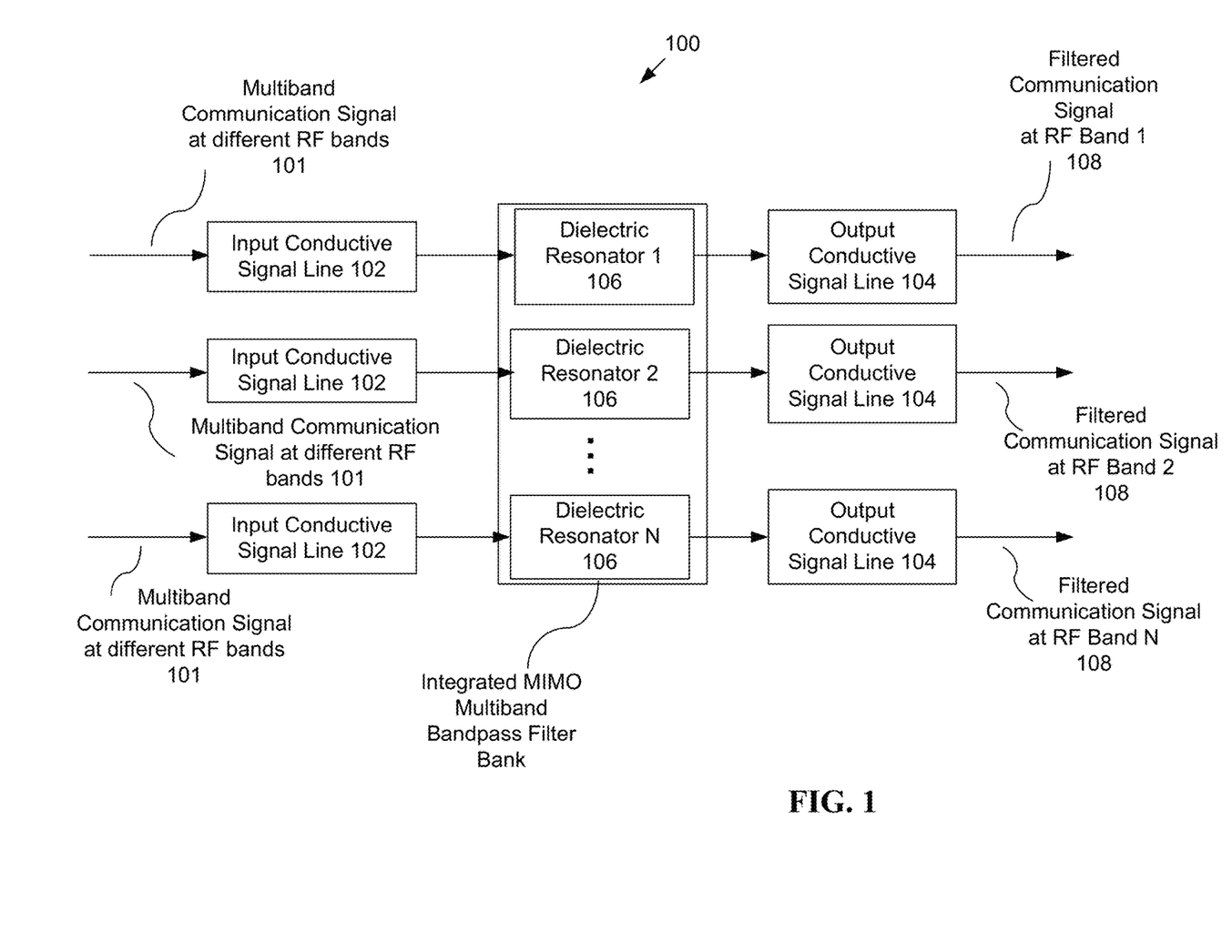
FIG. 1 illustrates an example of an integrated MIMO RF multi-band bandpass filter bank circuit having different dielectric resonators at different resonant frequencies that are at the centers of different desired frequency bands, and each of the dielectric resonators has separate coupling probes.

FIG. 1 shows an example of an integrated MIMO RF multi-band bandpass filter bank circuit 100 having different dielectric resonators at different resonant frequencies that are at the centers of different desired frequency bands. The MIMO multi-band bandpass filter bank circuit 100 includes a plurality of conductive signal lines 102 that carry a plurality of multi-band input RF signals having different communication signals at different RF frequency bands 101 (e.g., Band 1, Band 2, . . . Band N). For each RF frequency band, the input communication signals may occupy non-overlapping sections within the frequency band. This MIMO multi-band bandpass filter bank circuit also includes a plurality of output conductive signal lines 104 that carry the filtered output RF signal having filtered communication signals at different RF frequency bands 108 (e.g., Band 1, Band 2, . . . Band N), respectively. Between the input conductive signal lines 102 and the output conductive signal lines 104, a plurality of dielectric resonators 106 are introduced, where the dielectric resonators 106 are electromagnetically coupled to the input conductive signal lines 102 such that the energy in the different RF frequency bands in the input RF signals are separately coupled into the dielectric resonators 106 and thus are separated via the frequency-selective coupling.

The filtered signals 108, which are filtered by the dielectric resonators 106, are coupled to the output conductive signal lines 104 as output of the filter bank circuit 100. As illustrated, the communication signal at RF Band 1 is coupled into the Dielectric Resonator 1, the communication signal at RF Band 2 is coupled into the Dielectric Resonator 2, and so on. Also, as illustrated, each of the dielectric resonators 106 couples to a separate input conductive signal line 102 that transmits multi-band communication signals at different bands and a separate output conductive signal line 104 that transmits filtered communication signal at particular RF band. The filtered signal in each of the dielectric resonators is centered at the resonance frequency of the dielectric resonator and has a spectral bandwidth that is predetermined by its resonator quality factor Q.

Since the dielectric resonators are concentrically oriented with a circular ring or a cylindrical structure, the overall size of the integrated MIMO RF multi-band bandpass filter bank is minimized as compared to the use a group of multiple single-band discrete components of bandpass filters. In some embodiments, the overall size of the integrated MIMO RF multi-band bandpass filter bank may be less than 6 mm in length, 6 mm in width, and 4 mm in thickness. This is a significant savings in real estate compared to present day multi-band filters that often require upwards of 1 cm×1 cm circuit board area. By using dielectric materials with high relative permittivity to implement the concentric ring resonators, the disclosed technology can achieve very high Q value in the multi-band bandpass filter bank, thereby providing high rejection to the out-of-band spurious emission and interference. Furthermore, because the resonant frequencies of the disclosed ring resonators are shape-dependent and are nonlinear functions of the dimensions in the cases of circular geometries, the harmonics of a desired bandpass signal can be greatly rejected.

Figure 2:
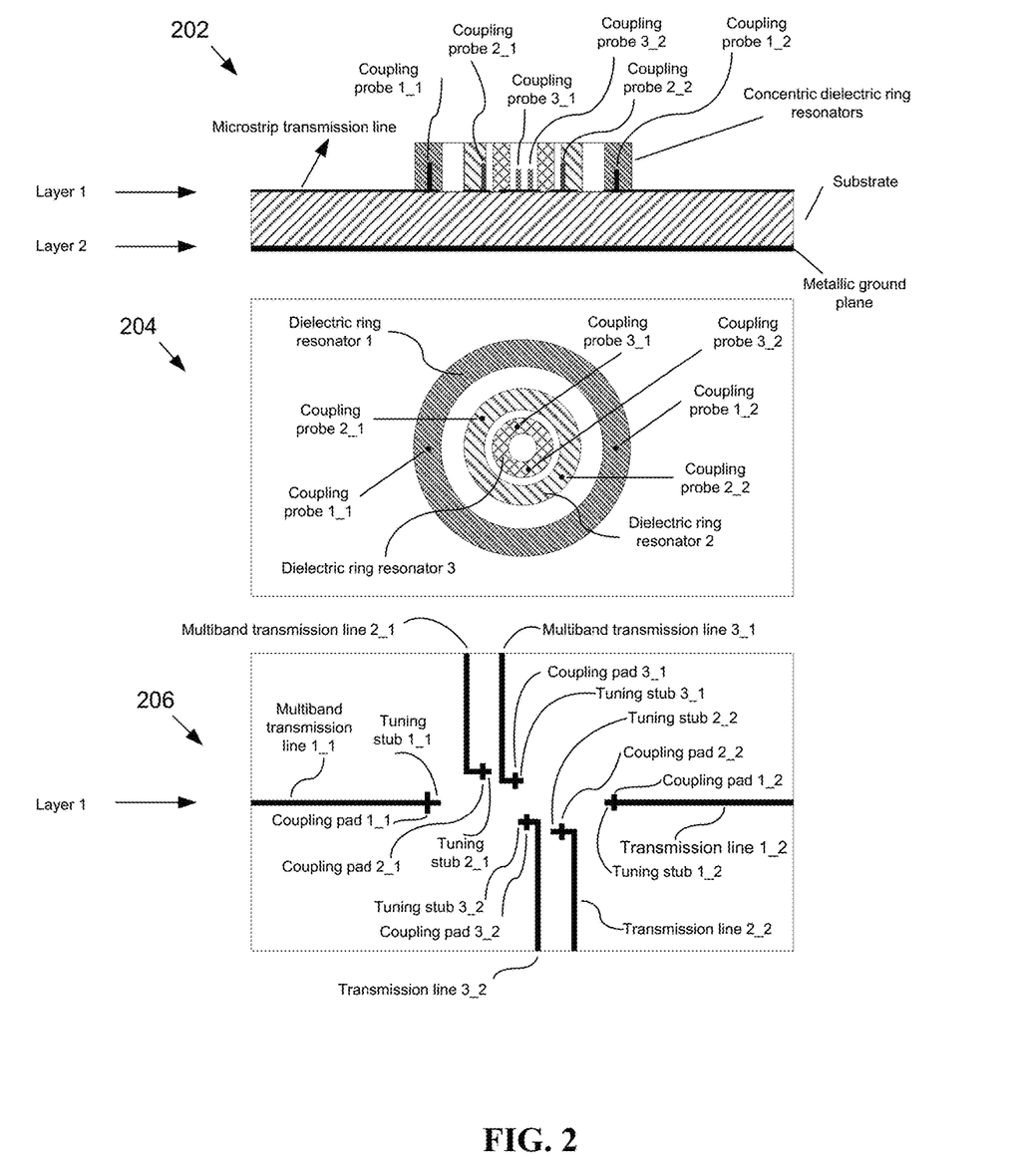
FIG. 2 shows an example embodiment of an integrated MIMO RF multi-band bandpass filter bank based on concentric dielectric ring resonators.

FIG. 2 illustrates an example embodiment of an integrated MIMO RF multi-band bandpass filter bank based on concentric dielectric ring resonators using probe coupling mechanism. The profile view 202 shows the filter bank laid on top of a substrate layer. The substrate may be over a metallic ground layer. One or more microstrip transmission lines may be positioned above the substrate to carry signals to and from the resonators.

In the example depicted in FIG. 2, a number of transmission lines, labeled as multi-band transmission line i_1 (i=1, 2, 3), which could transmit multi-band RF signals simultaneously, are illustrated. In the multi-band transmission line i_1 (i=1, 2, 3), there are multiple coupling pads, labeled as coupling pads i_1 (i=1, 2, 3). There are also multiple tuning stub, labeled as tuning stub i_1 (i=1, 2, 3) at the terminal of the multi-band transmission line i_1 (i=1, 2, 3).

As shown in the plan view 206, there are also multiple transmission lines, labeled as transmission line i_2 (i=1, 2, 3); each of these transmission line would transmit desired single-band bandpass signal at band i (i=1, 2, 3). In each of the transmission line there is tuning stub and coupling pad, labeled as tuning stub i_2 (i=1, 2, 3) and coupling pad i_2 (i=1, 2, 3), respectively. A plurality of concentric dielectric ring resonators, labeled as dielectric ring resonator i (i=1, 2, 3), is placed on top of the transmission lines i_1 (i=1, 2, 3) and i_2 (i=1, 2, 3). Perpendicular to each of the coupling pad, there is a plurality of coupling probes, labeled as coupling probe i_1 and i_2 (i=1, 2, 3), with coupling probes penetrate into the ring resonators to improve the signal coupling efficiency. The height of each coupling probe and physical dimensions of each tuning stub i_1 and i_2 (i=1, 2, 3) and coupling pad i_1 and i_2 (i=1, 2, 3) are optimized for impedances matching so that the coupling structure is impedance match with the transmission lines, typically 50 Ohm.

When multiple-input multi-band signals are transmitted through the multi-band transmission line i_1 (i=1, 2, 3), the signals couple into each of the dielectric ring resonator i (i=1, 2, 3) respectively and is filtered to generate bandpass signal, and then the filtered signals couple from the dielectric ring resonator i (i=1, 2, 3) into the multiple-output transmission line i_2 (i=1, 2, 3). Due to the frequency selective characteristics of the dielectric ring resonator i (i=1, 2, 3), only the desired bandpass signal could be coupled from the multiple-input multi-band signals into the multiple-output single-band transmission line i_2 (i=1, 2, 3), respectively. That is, the desired signal of band 1 outputs from the transmission line 1_2, desired signal of band 2 outputs from the transmission line 2_2, and so on. Since the resonant frequency of the dielectric ring resonator could be designed to operate at desired frequency band, only desired bandpass signal could be output from the respective transmission lines.

The three ring resonators, visible in the plan view 204, are generally co-planar, and have the same geometry center axis and are concentrically placed so that the real estate is significantly reduced. Furthermore, the coupling pads are beneath, or on the underside of, the resonators and coupling probes are penetrated inside the resonators to improve the coupling efficiency. Because the relative permittivity of the dielectric resonators could be very high, in the order of few thousands, the quality factor Q of the resonators would be high to form steep roll off for out-of-band emission. The dielectric materials between the ring resonators would have low relative permittivity to confine the electromagnetic waves inside each of the resonators, such as low-temperature poly-silicon (LTPS) or low-temperature co-fired ceramic (LTCC). To facilitate the handling and manufacturability in the assembly using surface mounted technology, a frame of cube of dielectric material with low permittivity could be added to encompass the structure of the integrated MIMO multi-band bandpass filter bank.

Furthermore, the resonant frequency is shape-dependent of the dielectric ring resonator. In the case of using circular or elliptical ring resonators, the high-order resonant frequencies of the higher-order modes can be nonlinear functions (e.g., Bessel and Mathieu functions in the circular and elliptical ring structure, respectively) of the resonator dimensions. Hence, by using circular or elliptical resonator elements in an integrated MIMO multi-band bandpass filter bank design, the harmonics of the desired passband can be greatly rejected. Additional details for an integrated multi-band bandpass filter on concentric dielectric ring resonators can be found in Appendix A (U.S. application Ser. No. 14/927,440, filed on Oct. 29, 2015, by Dajun Cheng and Hongwei Zhang).

Figure 3:
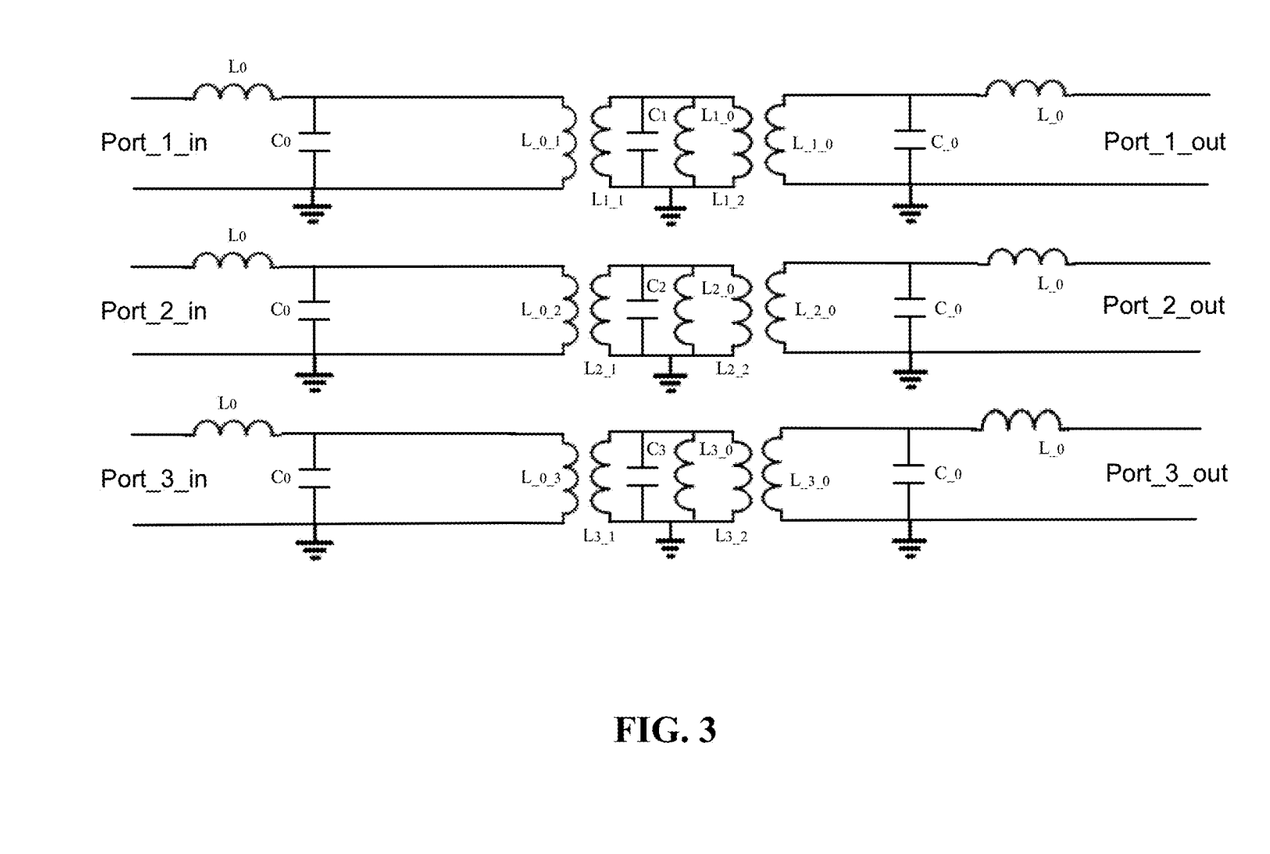
FIG. 3 shows an example equivalent circuit of an integrated MIMO RF multi-band bandpass filter bank, as illustrated in FIG. 2.

FIG. 3 illustrates an example equivalent circuit of the example embodiment of the integrated MIMO RF multi-band bandpass filter bank based on concentric dielectric ring resonators, as illustrated in FIG. 2. The multiple-input multi-band signals of band 1, 2, 3 input from transmission line port i, labeled as Port_i_in (i=1, 2, 3), electromagnetically couple into the dielectric resonator 1, 2, 3, respectively, and then the bandpass signals couple into the transmission line port, labeled as Port_i_out (i=1, 2, 3), separately. In FIG. 3, $L_0$ and $C_0$ represent the equivalent inductance and capacitance of the multi-band transmission line structure with terminal Port_i_in (i=1, 2, 3), ($L_{1\_1}$, $L_{1\_0}$, $L_{1\_2}$) and C1 represent the equivalent inductance and capacitance of the outer ring resonator 1, ($L_{2\_1}$, $L_{2\_0}$, $L_{2\_2}$) and C2 represent the equivalent inductance and capacitance of the middle ring resonator 2, and ($L_{3\_1}$, $L_{3\_0}$, $L_{3\_2}$) and C3 represent the equivalent inductance and capacitance of the inner ring resonator 3. L_0 and C_0 represent the equivalent inductance and capacitance of the transmission line structure with terminal Port_i_out (i=1, 2, 3). Furthermore, ($L_{1\_1}$, $L_{1\_0}$, $L_{1\_2}$) and C1 correspond to frequency f1, the central frequency of the first desired signal band; ($L_{2\_1}$, $L_{2\_0}$, $L_{2\_2}$) and C2 correspond to frequency f2, the central frequency of the second desired signal band; and ($L_{3\_1}$, $L_{3\_0}$, $L_{3\_2}$) and C3 correspond to frequency f3, the central frequency of the third desired signal band (f1<f2<f3). The resonant frequencies can be computed using the following equation:

$$f_i = 1/(2\pi\sqrt{L_i C_i}), \text{ where } 1/L_i = 1/+L_{i\_1} + 1/L_{i\_2} + 1/L_{i\_0} \text{ and } i=1,2,3 \qquad \text{Eq. (1)}$$

Figure 4:
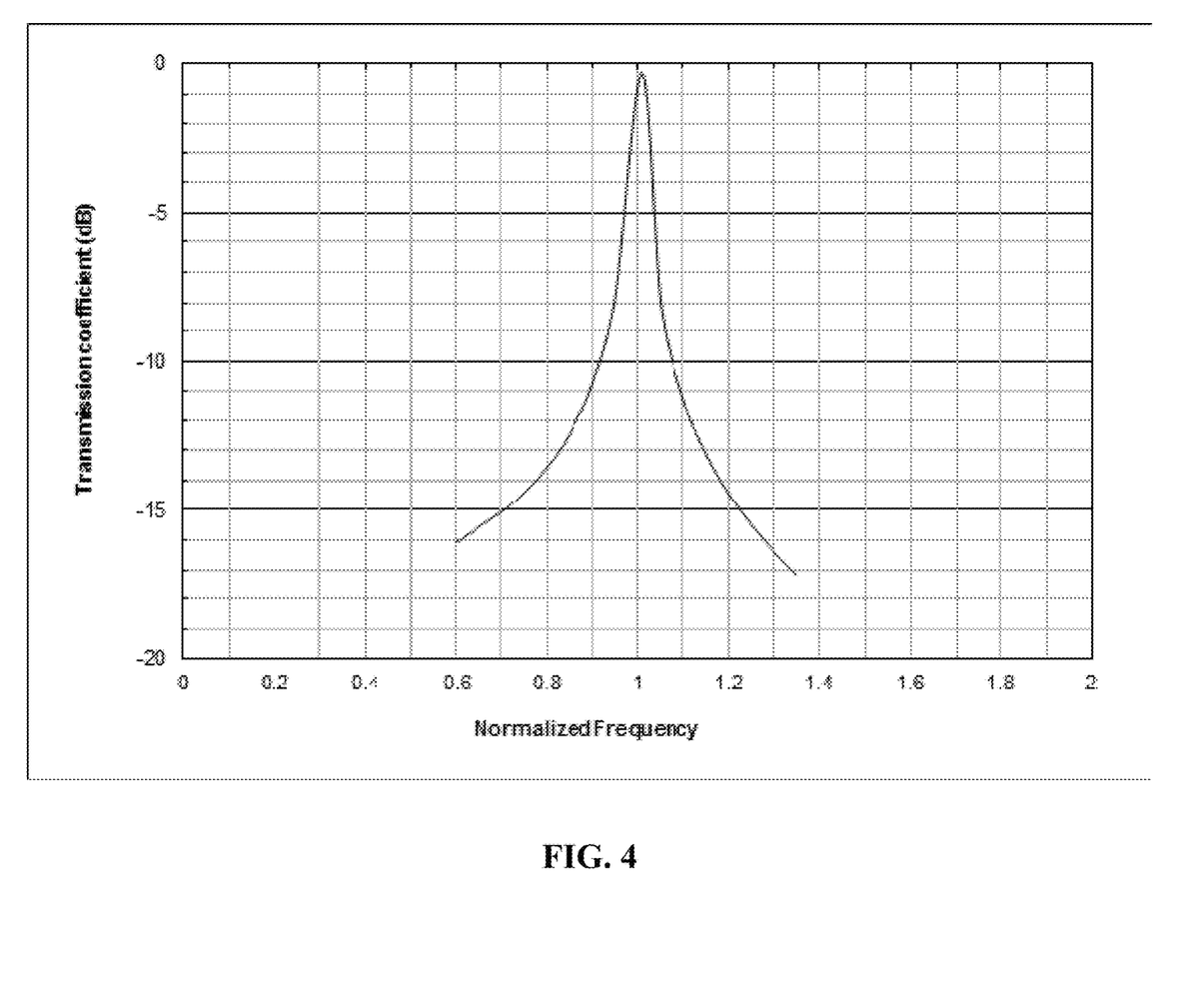
FIG. 4 shows an example RF transmission characteristics of a pair of RF ports in an integrated MIMO RF multi-band bandpass filter bank.

FIG. 4 shows an example RF transmission characteristics of a pair of the integrated MIMO RF multi-band bandpass filter bank, as illustrated in FIG. 2. In FIG. 4, the transmission coefficient is defined as the ratio of power at output Port_i_out to its corresponding input power at input Port_i_in. It is seen that the single-band bandpass signal would transmit from the multiple input terminal Port_i_in (i=1, 2, 3) of the multi-band transmission line i_1 (i=1, 2, 3) to the multiple transmission line i_2 (i=1, 2, 3) separately, while the out-of-band noise would be filtered out with considerable attenuation at each of the multiple output terminal Port_i_out (i=1, 2, 3). It is also shown the insertion loss of the integrated RF MIMO multi-band bandpass filter bank at desired frequency bands would be very small, due to the high efficiency electromagnetic coupling of the probe coupling scheme. Also, due to the high quality factors of the dielectric resonators, steep roll off of the S parameters could be achieved to attenuate the unwanted out-of-band emission.

To extend the bandwidth of a desired bandpass characterization, composite dielectric ring resonators can be arranged for the desired operation band. Each of the composite dielectric ring resonators is composed of a plurality of vertically-stacked layered resonator elements with different dielectrics, and each of these resonator elements has close resonant frequency so that the plurality of the resonator elements can have bandpass characteristics in the design band with desired operating bandwidth.

Figure 5:
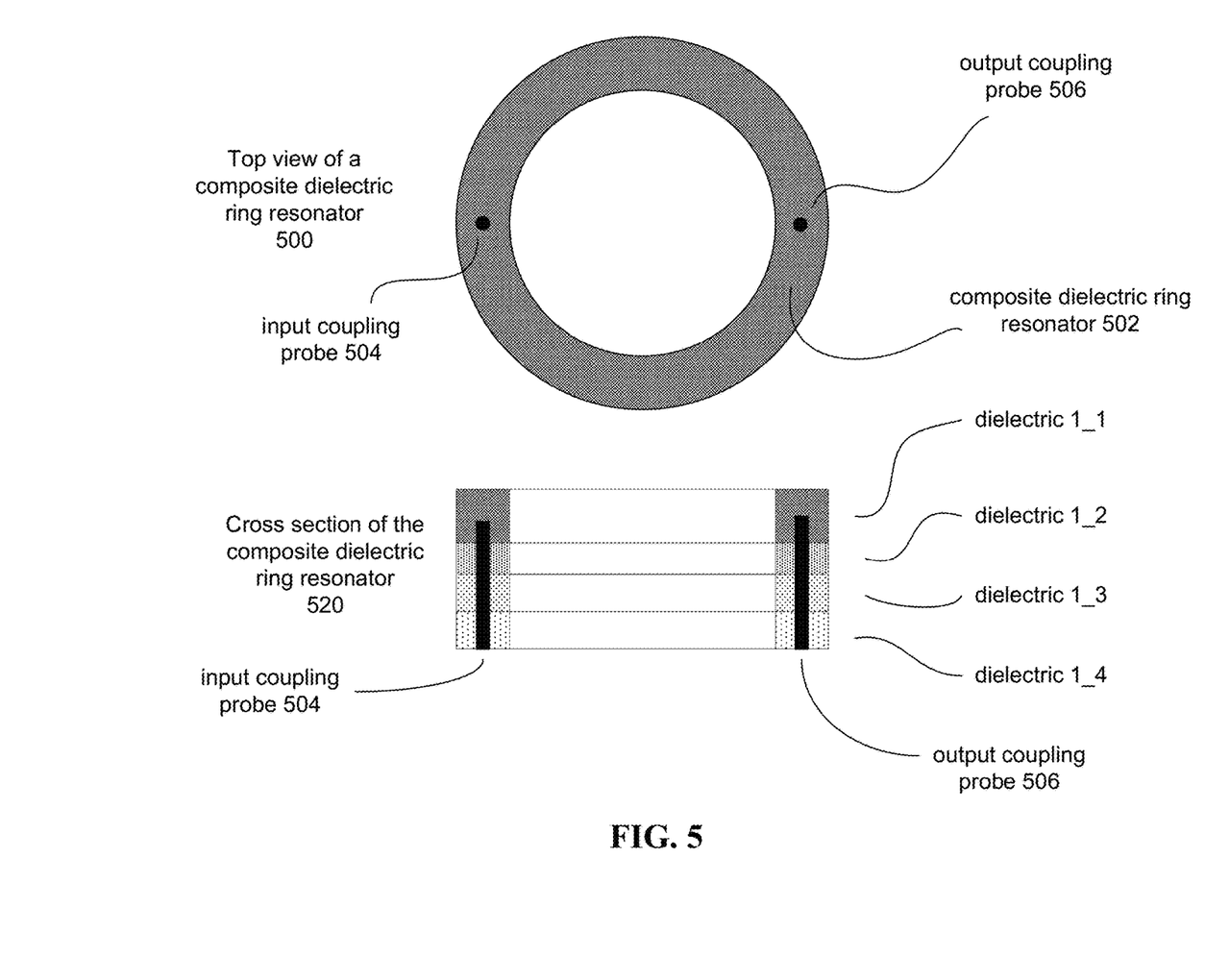
FIG. 5 illustrates an example of composite dielectric ring resonator for bandwidth extension, wherein the composite dielectric ring resonator is composed of four vertically-stacked layered resonator elements of different dielectrics.

FIG. 5 presents the top view 500 and cross section 520 of one example of the arrangement of a composite dielectric ring resonator that is composed of four resonators with the same radius but different dielectric constants. In FIG. 5, the composite dielectric ring resonator 502 is composed of four vertically layered resonators with different dielectric constant, labelled as dielectric j_1 (j=1, 2, 3, 4). The input and output coupling probes 504 and 506 penetrate into each of the layered resonator elements, and the RF signals couple with the four resonator elements respectively. To confine the electromagnetic signals inside each of the resonator elements, dielectric disk of low permittivity could be sandwiched between the resonator elements. Each of these four resonators with dielectric j_1 (j=1, 2, 3, 4) has close resonant frequency in operational band of the bandpass filter so that the composite resonator can have extended bandpass characteristics with the desired operating bandwidth.

Figure 6:
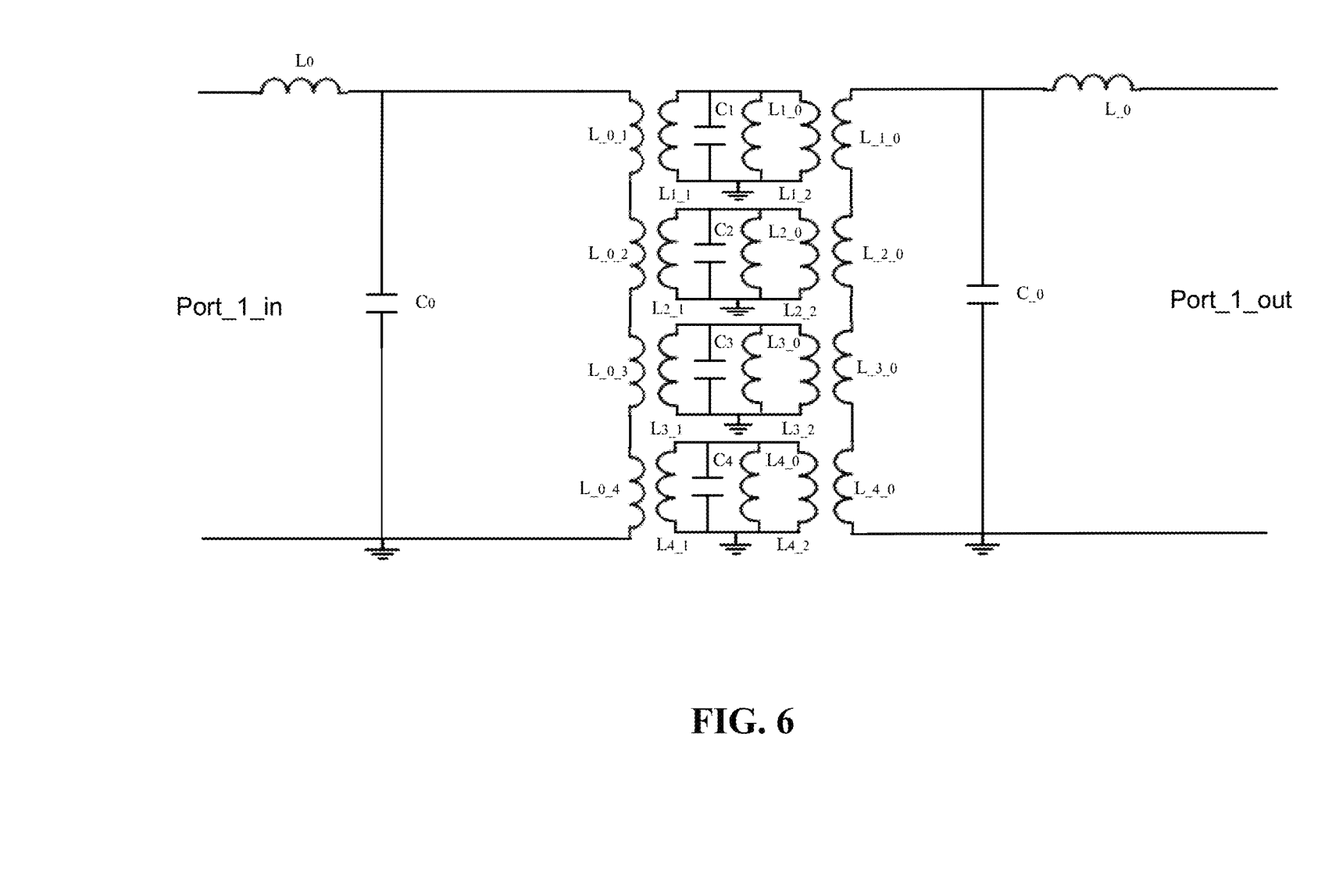
FIG. 6 illustrates an example equivalent circuit of the composite dielectric ring resonator with four vertically-stacked layered resonator elements, as illustrated in FIG. 5.

FIG. 6 illustrates the equivalent circuit of the composite dielectric ring resonator with four vertically-stacked layered resonator elements, as illustrated in FIG. 5. The signal input from transmission line port, labeled as Port_1_in, electromagnetically couple into the vertically-stacked layered dielectric resonators with dielectrics, labeled as 1_1, 1_2, 1_3, 1_4, respectively, via the input coupling probe, and then the filtered signals couple into the transmission line port, labeled as Port_1_out, separately, via the output coupling probe.

In FIG. 6, $L_0$ and $C_0$ represent the equivalent inductance and capacitance of the transmission line structure with terminal Port_1_in, ($L_{1\_1}$, $L_{1\_0}$, $L_{1\_2}$) and C1 represent the equivalent inductance and capacitance of the first top ring resonator with dielectric 1_1, ($L_{2\_1}$, $L_{2\_0}$, $L_{2\_2}$) and C2 represent the equivalent inductance and capacitance of the second top ring resonator with dielectric 1_2, ($L_{3\_1}$, $L_{3\_0}$, $L_{3\_2}$) and C3 represent the equivalent inductance and capacitance of the third top ring resonator with dielectric 1_3 and ($L_{4\_1}$, $L_{4\_0}$, $L_{4\_2}$) and $C_4$ represent the equivalent inductance and capacitance of the forth top ring resonator with dielectric 4. $L\_0$ and $C\_0$ represent the equivalent inductance and capacitance of the transmission line structure with terminal Port_1_out. Furthermore, ($L_{1\_1}$, $L_{1\_0}$, $L_{1\_2}$) and C1 correspond to frequency f1, the central frequency of the first desired carrier signal; ($L_{2\_1}$, $L_{2\_0}$, $L_{2\_2}$) and C2 correspond to frequency f2, the central frequency of the second desired carrier signal; ($L_{3\_1}$, $L_{3\_0}$, $L_{3\_2}$) and C3 correspond to frequency f3, the central frequency of the third desired carrier signal; and ($L_{4\_1}$, $L_{4\_0}$, $L_{4\_2}$) and $C_4$ correspond to frequency f4, the central frequency of the forth desired carrier signal; (f1<f2<f3<f4). The resonant frequencies can be computed using the following equation:

$$f_i = 1/(2\pi\sqrt{L_i C_i}), \text{ where } 1/L_i = 1/+L_{i\_1} + 1/L_{i\_2} + 1/L_{i\_0} \text{ and } i=1,2,3,4. \qquad \text{Eq. (2)}$$

Figure 7:
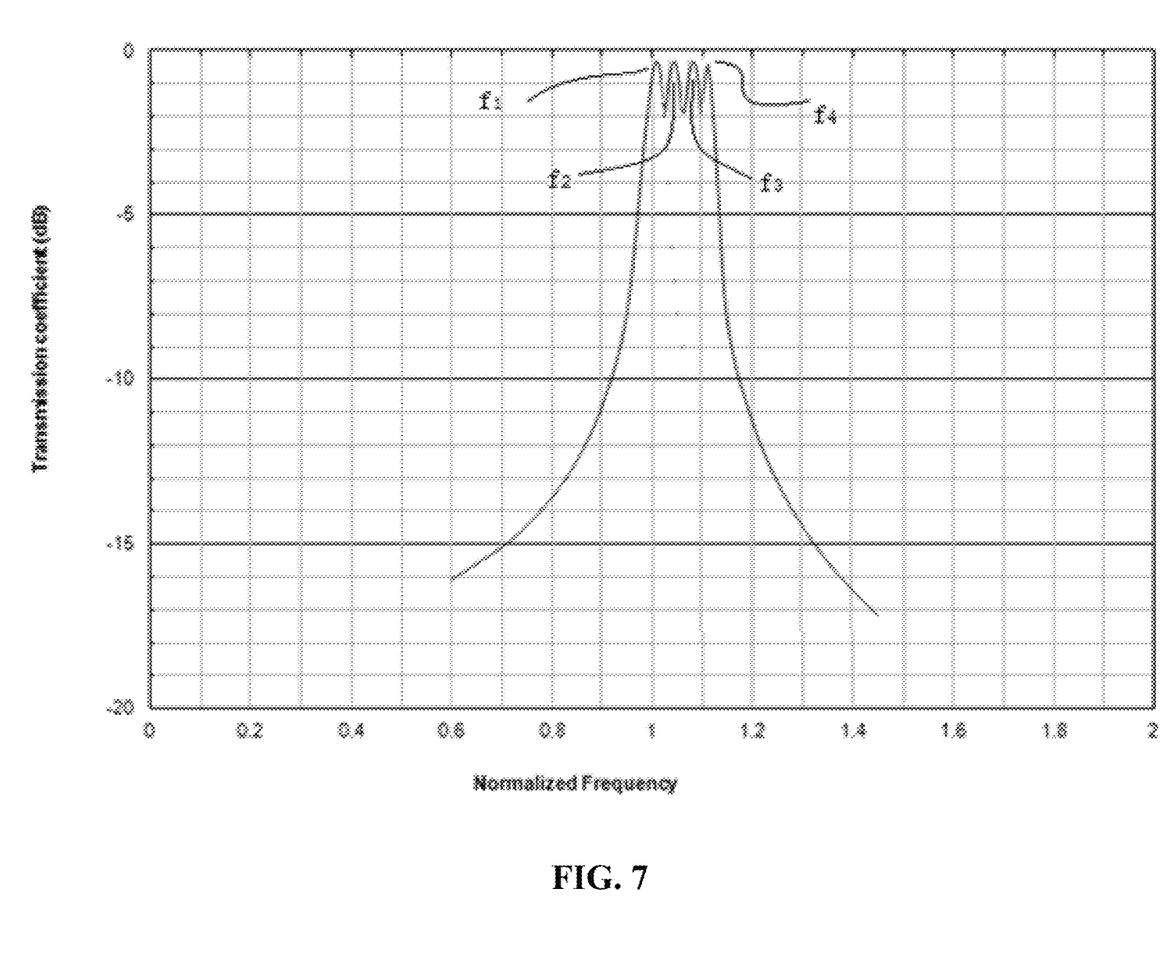
FIG. 7 shows an example RF transmission characteristics of a pair of RF ports in an integrated MIMO RF multi-band bandpass filter bank with composite dielectric ring resonator, as illustrated in FIG. 5.

FIG. 7 presents the transmission characteristics of a pair of ports in a composite dielectric ring resonator which is composed of four resonators with the same radius but different dielectric constants, as shown in FIG. 6. It is shown the overall bandwidth of the composite dielectric ring resonator is extended in the operation band by using four vertically layered resonator elements with close resonant frequencies, $f_1$, $f_2$, $f_3$, and $f_4$.

Figure 8:
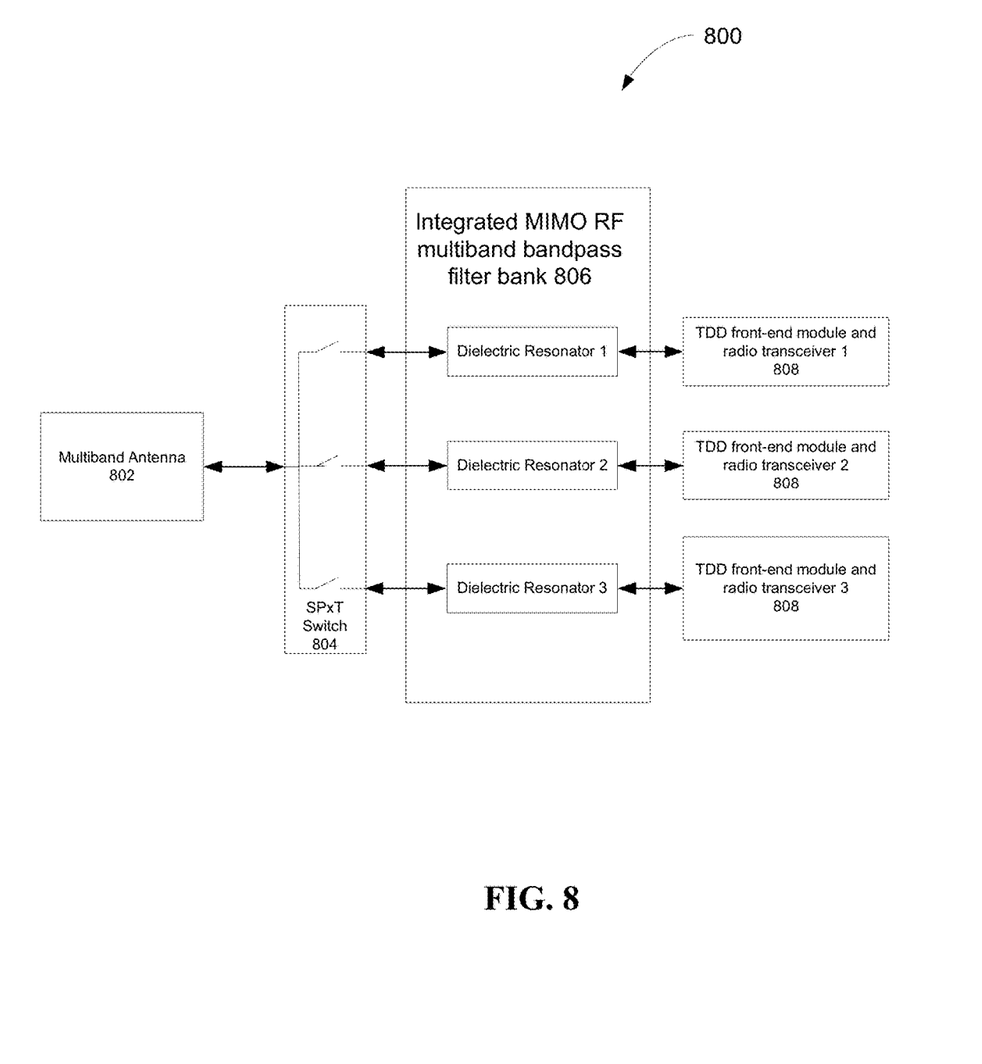
FIG. 8 illustrates an example block diagram of a multi-band RF communication system using an integrated MIMO RF multi-band bandpass filter bank based on multiple ring dielectric resonators.

As an application example of the disclosed technology, FIG. 8 illustrates an example block diagram of a multi-band RF communication system 800 using an integrated MIMO RF multi-band bandpass filter bank based on multiple ring dielectric resonators. In FIG. 8, the multi-band RF communication system 800 includes a multi-band antenna 802, a single-pull multiple throw (SP×T) switch 804 for band selection, an integrated MIMO multi-band bandpass filter bank 806, and a plurality of TDD RF front-end module and radio transceivers 808. In the process of signal transmission, the radio signal transmits from a specific front end module and radio transceiver to the integrated MIMO RF multi-band bandpass filter bank 806, and then through the SP×T switch 804 and multi-band antenna 802 for uplink radio signal transmission. In the downlink radio signal reception, the received radio signal goes through the multi-band antenna 802, the SP×T switch 804, and then through the integrated MIMO multi-band bandpass filter bank 806 to the front end module and radio transceiver.

In one aspect, an integrated MIMO multi-band bandpass filter bank is disclosed. The integrated MIMO multi-band bandpass filter bank comprises a plurality of transmission line structures for transmitting and receiving radio frequency signals; and a plurality of concentric ring resonators with different sizes and different resonant frequencies electromagnetically coupled to the plurality of transmission line structures, wherein each ring resonator of the plurality of concentric ring resonators is configured as a single-band bandpass filter to allow a bandpass signal to pass through.

In some embodiments, the RF signals comprise multi-band signals having communication signals at different RF frequency bands, wherein the multi-band signals at the different RF frequency bands are separately coupled to the plurality of concentric ring resonators.

In some embodiments, the integrated MIMO multi-band bandpass filter bank further comprises a conductive layer as a ground plane, and a dielectric substrate positioned above the conductive layer. The plurality of concentric ring resonators may be placed on top of the conductive layer. The plurality of transmission line structures may comprise coupling pads beneath the plurality of concentric ring resonators, and coupling probes perpendicular to the coupling pads and penetrating into the plurality of concentric ring resonators. Each ring resonator of the plurality of concentric ring resonators, in some implementations, includes two coupling probes for feeding and coupling signals between the plurality of transmission line structures and the ring resonator. At least two of the plurality of transmission line structures transmit multi-band RF signals, and at least two of the plurality of transmission line structures transmit single-band RF signals.

In some embodiments, each ring resonator of the plurality of concentric ring resonators is a dielectric ring resonator. Each dielectric ring resonator can be made of a high quality dielectric material with high relative permittivity so that out-of-band spurious emission, harmonic emission, and interference are attenuated and suppressed.

In some embodiments, the plurality of concentric ring resonators are also coplanar. The concentric ring resonators may have gaps between each ring resonator and the gaps are filled with a low dielectric constant material. The plurality of concentric ring resonators can also be encompassed in a cube wherein gaps between the outer surface of the plurality of concentric ring resonators and the inner surface of the cube are filled with a low dielectric constant material.

In some embodiments, at least one of the plurality of concentric ring resonator is a composite ring resonator composed of a plurality of vertically-stacked layered resonator elements having resonant frequencies in operational band of the bandpass filter, wherein the plurality of resonator elements have same cross section and different dielectric constants. A plurality of dielectric disks of low permittivity can be placed between the plurality of resonator elements to separate the plurality of resonator elements.

In another aspect, a multi-band RF communication device is disclosed. The device comprises a multi-band antenna, a band selection switch coupled to the multi-band antenna, a plurality of multi-band RF transceiver circuits for RF signal transmission, and an integrated multi-band bandpass filter bank including a plurality of RF input ports coupled to the band selection switch and a plurality of RF output ports coupled to the plurality of multi-band RF transceiver circuits.

In some embodiments, each transceiver circuit of the plurality of multi-band RF transceiver circuits transmits and receives RF signals of a radio frequency band corresponding to a desired passband.

In some embodiments, the integrated multi-band bandpass filter bank comprises a plurality of transmission line structures for transmitting and receiving RF signals, and a plurality of concentric ring resonators with different sizes and different resonant frequencies electromagnetically coupled to the plurality of transmission line structures, wherein each ring resonator of the plurality of concentric ring resonators is a single-band bandpass filter to generate a designed bandpass signal having a central frequency.

In some embodiments, the plurality of concentric ring resonators are also coplanar. the plurality of concentric ring resonators may have gaps between each ring resonator and the gaps are filled with a low dielectric constant material. The plurality of concentric ring resonators can also be encompassed in a cube wherein gaps between the outer surface of the plurality of concentric ring resonators and the inner surface of the cube are filled with a low dielectric constant material.

In some embodiments, at least one of the plurality of concentric ring resonator is a composite ring resonator composed of a plurality of vertically-stacked layered resonator elements having resonant frequencies in operational band of the bandpass filter. The plurality of resonator elements may have same cross section and different dielectric constants. A plurality of dielectric disks of low permittivity are placed between the plurality of resonator elements to physically separate the plurality of resonator elements.

Figure 9:
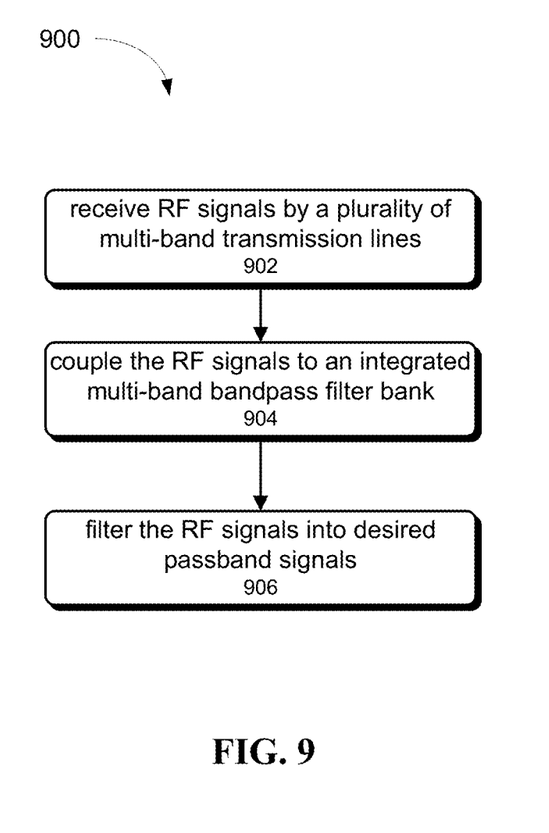
FIG. 9 presents a flowchart illustrating an exemplary process for filtering multi-band RF signals within a multi-band RF communication device.

FIG. 9 presents a flowchart illustrating an exemplary process 900 for filtering multi-band RF signals within a multi-band RF communication device. This process includes receiving multi-band RF signals by a plurality of multi-band transmission lines (902) and coupling the multi-band RF signals to an integrated multi-band bandpass filter bank (904). The integrated multi-band bandpass filter then filters the multi-band RF signals into desired passband signals (906). In some embodiments, each multi-band transmission line of the plurality of multi-band transmission lines includes a coupling pad, a tuning stub, and a coupling probe.

It will be appreciated that an integrated MIMO multi-band bandpass filter bank is disclosed. This MIMO multi-band bandpass filter bank includes a plurality of transmission line structures for transmitting and receiving multi-band RF signals. The MIMO multi-band bandpass filter bank also includes a plurality of ring resonators of different sizes and different resonant frequencies electromagnetically coupled to the transmission line structures to receive and transmit the multi-band RF signals. Each of the plurality of concentric ring resonators is configured as a bandpass filter for filtering a bandpass signal having a central frequency corresponding to the associated resonant frequency of the ring resonator.

It will also be appreciated that a multi-band RF communication device is disclosed. This multi-band RF communication device includes: a multi-band antenna; a band-selection SP×T switch; an integrated MIMO multi-band bandpass filter bank that is configured to input or output multiple desired bandpass signals; and multi-band RF transceiver circuits conductively coupled to the integrated MIMO multi-band bandpass filter bank.

It will also be appreciated that a technique for filtering multi-band RF signals within a multi-band RF communication device is described. This technique includes first receiving multi-band RF signals at a multi-band antenna and coupling the multi-band RF signals to a band-selection SP×T switch and then to an integrated MIMO multi-band bandpass filter bank. The integrated MIMO multi-band bandpass filter bank then filters the multi-band RF signals into multiple desired bandpass signals; and outputs the multiple desired bandpass signals to a plurality of multi-band RF transceiver circuits.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. An integrated multiple-input multiple-output (MIMO) multi-band bandpass filter bank, comprising:
   a plurality of transmission line structures for transmitting and/or receiving radio frequency (RF) signals; and
   a plurality of concentric ring resonators with different sizes and different resonant frequencies electromagnetically coupled to the plurality of transmission line structures,
   wherein each ring resonator of the plurality of concentric ring resonators is a single-band bandpass filter to allow signals within the single-band to pass through while attenuating remaining signals, and
   wherein at least one of the plurality of concentric ring resonator is a composite ring resonator composed of a plurality of vertically-stacked layered resonator elements having resonant frequencies in an operational band of the bandpass filter.

2. The integrated MIMO multi-band bandpass filter bank of claim 1, wherein the RF signals comprise multi-band signals having communication signals at different RF frequency bands.

3. The integrated MIMO multi-band bandpass filter bank of claim 2, wherein the multi-band signals at the different RF frequency bands are separately coupled to the plurality of concentric ring resonators.

4. The integrated MIMO multi-band bandpass filter bank of claim 1, further comprising:
 a conductive layer as a ground plane; and
 a dielectric substrate positioned above the conductive layer.

5. The integrated MIMO multi-band bandpass filter bank of claim 4, wherein the plurality of concentric ring resonators is placed on top of the conductive layer.

6. The integrated MIMO multi-band bandpass filter bank of claim 4, wherein each ring resonator of the plurality of concentric ring resonators includes two coupling probes for feeding and coupling signals between the plurality of transmission line structures and the ring resonator.

7. The integrated MIMO multi-band bandpass filter bank of claim 1, wherein the plurality of transmission line structures comprises:
 coupling pads beneath the plurality of concentric ring resonators, and
 coupling probes perpendicular to the coupling pads and penetrating into the plurality of concentric ring resonators.

8. The integrated MIMO multi-band bandpass filter bank of claim 1, wherein at least two of the plurality of transmission line structures transmit multi-band RF signals, and at least two of the plurality of transmission line structures transmit single-band RF signals.

9. The integrated MIMO multi-band bandpass filter bank of claim 1, wherein each ring resonator of the plurality of concentric ring resonators is a dielectric ring resonator.

10. The integrated MIMO multi-band bandpass filter bank of claim 9, wherein each dielectric ring resonator is made of a dielectric material with high relative permittivity so that out-of-band spurious emission, harmonic emission, and interference are attenuated and suppressed.

11. The integrated MIMO multi-band bandpass filter bank of claim 1, wherein the plurality of concentric ring resonators is coplanar.

12. The integrated MIMO multi-band bandpass filter bank of claim 1, wherein the plurality of concentric ring resonators is gaps between each ring resonator and the gaps are filled with a low dielectric constant material.

13. The integrated MIMO multi-band bandpass filter of claim 1, wherein the plurality of concentric ring resonators is encompassed in a cube wherein gaps between the outer surface of the plurality of concentric ring resonators and the inner surface of the cube are filled with a low dielectric constant material.

14. The integrated MIMO multi-band bandpass filter bank of claim 1, wherein the plurality of resonator elements has same cross section.

15. The integrated MIMO multi-band bandpass filter bank of claim 1, wherein the plurality of resonator elements has different dielectric constants.

16. The integrated MIMO multi-band bandpass filter bank of claim 1, wherein a plurality of dielectric disks of low permittivity are placed between the plurality of resonator elements to separate the plurality of resonator elements.

17. A multi-band radio frequency (RF) communication device, comprising:
 a multi-band antenna,
 a band selection switch coupled to the multi-band antenna,
 a plurality of multi-band RF transceiver circuits for RF signal transmission, and
 an integrated multi-band bandpass filter bank including a plurality of RF input ports coupled to the band selection switch and a plurality of RF output ports coupled to the plurality of multi-band RF transceiver circuit,
 wherein the integrated multi-band bandpass filter bank comprises:
  a plurality of transmission line structures for transmitting and receiving RF signals; and
  a plurality of concentric ring resonators with different sizes and different resonant frequencies electromagnetically coupled to the plurality of transmission line structures,
 wherein each ring resonator of the plurality of concentric ring resonators is a single-band bandpass filter to generate a designed bandpass signal having a central frequency, and
 wherein at least one of the plurality of concentric ring resonator is a composite ring resonator composed of a plurality of vertically-stacked layered resonator elements having resonant frequencies in operational band of the bandpass filter.

18. The multi-band RF communication device of claim 17, wherein each transceiver circuit of the plurality of multi-band RF transceiver circuits transmits and receives RF signals of a radio frequency band corresponding to a desired passband.

19. The multi-band RF communication device of claim 17, wherein the plurality of concentric ring resonators is coplanar.

20. The multi-band RF communication device of claim 17, wherein the plurality of concentric ring resonators has gaps between each ring resonator and the gaps are filled with a low dielectric constant material.

21. The multi-band RF communication device of claim 17, wherein the plurality of concentric ring resonators is encompassed in a cube wherein gaps between the outer surface of the plurality of concentric ring resonators and the inner surface of the cube are filled with a low dielectric constant material.

22. The multi-band RF communication device of claim 17, wherein the plurality of resonator elements has same cross section.

23. The multi-band RF communication device of claim 17, wherein the plurality of resonator elements has different dielectric constants.

24. The multi-band RF communication device of claim 17, wherein a plurality of dielectric disks of low permittivity are placed between the plurality of resonator elements to physically separate the plurality of resonator elements.

25. A method for filtering multi-band RF signals within a multi-band RF communication device, comprising:
 receiving RF signals by a plurality of multi-band transmission lines;
 coupling the RF signals to an integrated multi-band bandpass filter bank comprising a plurality of concentric ring resonators, wherein each ring resonator of the plurality of concentric ring resonators operates at a separately desired frequency; and
 filtering, at the integrated multi-band bandpass filter, the RF signals into desired passband signals, wherein at least one of the plurality of ring resonator is a composite ring resonator composed of a plurality of vertically-stacked layered resonator elements having resonant frequencies in operational band of the bandpass filter.

26. The method of claim 25, wherein each multi-band transmission line of the plurality of multi-band transmission lines includes a coupling pad, a tuning stub, and a coupling probe.

27. The method of claim 26, wherein coupling the RF signals to the integrated multi-band bandpass filter further comprises:
propagating a first signal of the RF signals having a first frequency onto a first coupling probe; and
propagating a second signal of the RF signals having a second frequency onto a second coupling probe;
wherein the first coupling probe is coupled to a first multi-band transmission line through the coupling pad and the tuning stub of the first multi-band transmission line, and the second coupling probe is coupled to a second multi-band transmission line through the coupling pad and the tuning stub of the second multi-band transmission line.

28. The method of claim 25, wherein the plurality of resonator elements has same cross section.

29. The method of claim 25, wherein the plurality of resonator elements has different dielectric constants.

30. The method of claim 25, wherein a plurality of dielectric disks of low permittivity are placed between the plurality of resonator elements to physically separate the plurality of resonator elements.

* * * * *